(12) United States Patent
Ringer et al.

(10) Patent No.: US 9,806,301 B2
(45) Date of Patent: Oct. 31, 2017

(54) BATTERY PACK

(71) Applicant: Black & Decker Inc., Newark, DE (US)

(72) Inventors: Paul Ringer, Shotley Bridge (GB); Scott Keenlyside, Bishop Auckland (GB); Martyn Riley, Jesmond (GB)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 14/602,751

(22) Filed: Jan. 22, 2015

(65) Prior Publication Data
US 2015/0214519 A1    Jul. 30, 2015

(30) Foreign Application Priority Data

Jan. 24, 2014   (GB) .................................. 1401197.7

(51) Int. Cl.
*H01M 2/10*    (2006.01)
*H01M 2/02*    (2006.01)

(52) U.S. Cl.
CPC ......... *H01M 2/0217* (2013.01); *H01M 2/105* (2013.01); *H01M 2220/30* (2013.01); *Y10T 29/49108* (2015.01)

(58) Field of Classification Search
None
See application file for complete search history.

(56) References Cited

U.S. PATENT DOCUMENTS

| | | | | |
|---|---|---|---|---|
| 4,593,461 A * | 6/1986 | Thiele | ............... | H01M 2/105 29/623.1 |
| 5,589,288 A | 12/1996 | Coulson et al. | | |
| 6,458,481 B1 * | 10/2002 | Tan | ............... | H01M 2/1027 361/752 |
| 6,884,540 B2 * | 4/2005 | Chikada | ............... | H01M 2/0207 429/100 |

(Continued)

FOREIGN PATENT DOCUMENTS

DE    102011114526 A1    4/2013
EP    2193562 A1    6/2010

(Continued)

OTHER PUBLICATIONS

Chinese Office Action dated Aug. 30, 2016 issued in corresponding Chinese patent application.

(Continued)

*Primary Examiner* — Jonathan G Leong
*Assistant Examiner* — Christopher Domone
(74) *Attorney, Agent, or Firm* — Michael Aronoff (57) ABSTRACT

A battery pack comprises a first battery cell and a second battery cell; the first and second battery cells each have a size within a manufacturing tolerance. A housing comprises at least one wall defining a first hole and a second hole, each hole for receiving one of the first or second battery cells, each hole having a size corresponding to a minimum size within the manufacturing tolerance. There is a flexibly resilient portion moveable between a rest position and a clamping position whereby the flexibly resilient portion clamps against at least one of the first and second battery cells when one of the first or second battery cells has a size greater than the minimum size within the manufacturing tolerance.

11 Claims, 5 Drawing Sheets

(56) References Cited

U.S. PATENT DOCUMENTS

| | | | |
|---|---|---|---|
| 8,343,643 B2 | 1/2013 | Miller et al. | |
| 2008/0305388 A1* | 12/2008 | Haussman | H01M 2/105 429/120 |
| 2010/0248016 A1* | 9/2010 | Hanawa | H01M 2/1055 429/178 |
| 2012/0225340 A1 | 9/2012 | Mullet et al. | |
| 2013/0136971 A1* | 5/2013 | Igarashi | H01M 2/1072 429/99 |

FOREIGN PATENT DOCUMENTS

| | | |
|---|---|---|
| EP | 2495786 A1 | 9/2012 |
| EP | 2500961 A1 | 9/2012 |
| EP | 2600439 A2 | 6/2013 |
| JP | S60124352 A | 7/1985 |
| JP | H03190052 A | 8/1991 |
| WO | 01/28008 A1 | 4/2001 |
| WO | 0128008 A1 | 4/2001 |

OTHER PUBLICATIONS

European Office Action dated Dec. 22, 2016 issued in corresponding European patent application.
European Search Report dated Apr. 23, 2015.
EP Office Action dated Aug. 30, 2017 issued in corresponding EP application No. 14 191 793.0.

* cited by examiner

BATTERY PACK

FIELD OF THE INVENTION

The present invention relates to a battery pack. In particular the present invention relates to battery pack for lithium based cells.

BACKGROUND OF THE INVENTIONS

Battery packs for consumer electrical products often comprise battery packs for providing power to the electrical product. Typically cordless consumer electrical products will have a rechargeable battery pack. Recently much effort has been put into understanding and developing new battery technologies. Improving batteries and increasing battery capacity is desirable because this increases the run time of the cordless electrical product.

Today most battery powered consumer electrical products will comprise a lithium ion battery pack. Lithium ion (Li-ion) based batteries packs are an improvement on other existing battery technologies such as Nickel Cadmium (Ni-Cad) because they are lighter and have a greater energy density. However Li-ion batteries are susceptible to damage from physical shocks and require suitable protection.

A known battery pack is shown in U.S. Pat. No. 8,343,643 which provides a support frame having a plurality of recesses for receiving a plurality of battery cells. One problem with the support frame is that unless the battery cells are manufactured to a very high tolerance, some cells will not fit the support frame properly. For example some cells will be smaller in diameter than the recesses and the cells will be prone to rattling when located in the recesses of the support frame.

EP 2 193 562 provides a battery pack with a housing and several battery cells. The battery cells are spaced apart from each other with a spreading element that allows battery cells with varying sizes due to manufacturing tolerances to be used in the same battery pack. A problem with this battery pack is that the spreading elements are directional and can be inserted incorrectly. This means that the battery packs take longer and are harder to assemble.

A battery pack providing an arrangement which can withstand physical shocks and is easier to assemble is desired. Embodiments of the present invention aim to address the aforementioned problems.

SUMMARY OF THE INVENTION

According to an aspect of the present invention there is a battery pack comprising: a first battery cell and a second battery cell, the first and second battery cells each have a size within a manufacturing tolerance; and a housing comprising at least one wall defining a first hole and a second hole, each hole for receiving one of the first or second battery cells, each hole having a size corresponding to a minimum size within the manufacturing tolerance; and a flexibly resilient portion moveable between a rest position and a clamping position whereby the flexibly resilient portion clamps against at least one of the first and second battery cells when one of the first or second battery cells has a size greater than the minimum size within the manufacturing tolerance.

Due to manufacturing processes, identical battery cells will differ slightly in size and shape. The battery cells will differ over a determined manufacturing tolerance. The housing can adapt to different sized battery cells and this means that every battery cell within the manufacturing tolerance range will fit snugly in the housing. Since the holes and the housing accommodate the size variation as soon at the battery cell is inserted into the hole, assembly is quicker because there are less parts involved.

Preferably the flexibly resilient portion is an internal dividing wall between the first and second holes. Preferably the internal dividing wall comprises a slot connecting the first hole to the second hole. Preferably the flexibly resilient portion comprises a top wall portion of the housing and a bottom wall portion both moveable relative to each other. This means that the flexibly resilient portion of the housing can be integral with the housing.

Preferably the cross section shape of the first and second holes and the first and second battery cells is circular. Preferably an inside surface of at least one of the first and second holes is engageable with the outer surface of at least one of the first and second battery cells along substantially the entire longitudinal axis of the at least one first and second battery cell. This means that the entire surface can be used for the interference fit and can provide the best possible fit.

Preferably the first and second battery cells are lithium based battery cells.

Preferably the housing is mounted within a protective outer shell.

Preferably each hole has a size corresponding to a minimum size within the manufacturing tolerance such that the first and second battery cells are held in the first and second holes, respectively with an interference fit.

Preferably the housing further comprises a plurality of groups of first and second holes and first and second battery cells, each group comprising a separate flexible resilient portion. The structure as recited in the first aspect can be repeated any number of times to provide battery packs with any number of batteries.

Preferably the housing is a unitary moulded element. This means that there are less parts during manufacture and assembly of the battery packs is quicker.

According to another aspect of the present invention there is provided a method of manufacturing a battery pack, the method comprising the steps of: moulding a housing comprising at least one wall defining a first hole and a second hole, each hole for receiving one of a first or a second battery cell, each hole having a size corresponding to a minimum size within a manufacturing tolerance of a size of the first and second battery cells; and a flexibly resilient portion moveable between a rest position and a clamping position whereby the flexibly resilient portion clamps against at least one of the first and second battery cells when one of the first or second battery cells has a size greater than the minimum size within the manufacturing tolerance; and inserting the first and second battery cells into the first and second holes respectively.

Various other aspects and further embodiments are also described in the following detailed description and in the attached claims with reference to the accompanying drawings, in which:

DETAILED DESCRIPTION OF THE INVENTION

Figure 1:
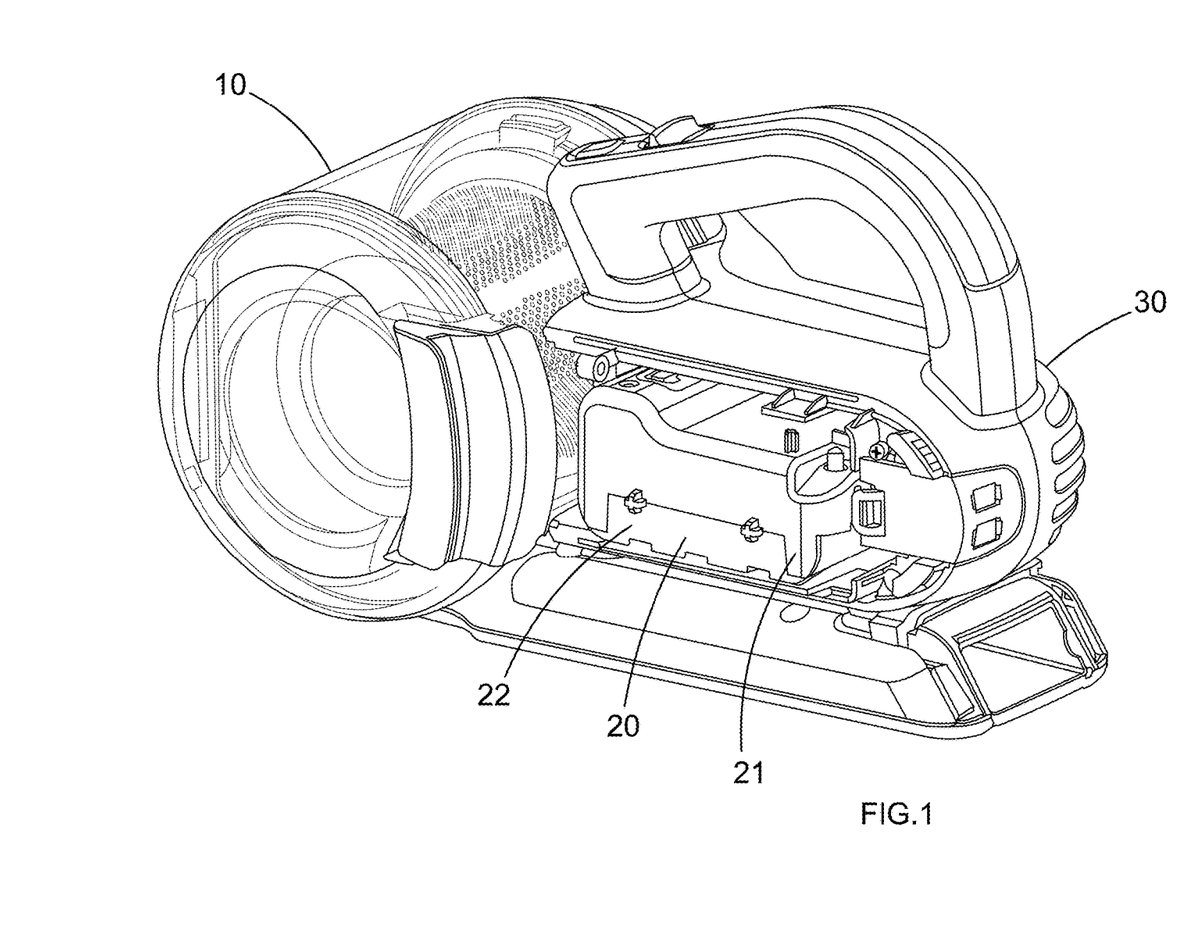
FIG. 1 shows a perspective view of an electrical consumer product comprising a battery pack according to one embodiment.

FIG. 1 shows a perspective view of an electrical consumer product 10. In this particular example the electrical consumer product is a vacuum cleaner but the battery pack described herein could be used for any electrical product. FIG. 1 shows the vacuum cleaner 10 without a side panel and exposes a battery pack 20 mounted within a housing 30 of the vacuum cleaner 10. The battery pack 20 may be clipped to the housing 30 or fixed in place with any other suitable means such as screws or glue. The vacuum cleaner 10 comprises a motor coupled to a fan (both not shown) and the motor is electrically coupled to the battery pack 20.

The battery pack 20 comprises an optional outer shell having a first part 21 and a second part 22. The optional outer shell provides additional physical protection to the battery cells mounted therein. The first part and the second part 21, 22 of the outer shell clip together. In some embodiments the outer shell is made from a hard plastic material such as acrylonitrile butadiene styrene (ABS) or any other suitable thermoplastic material.

Figure 2:
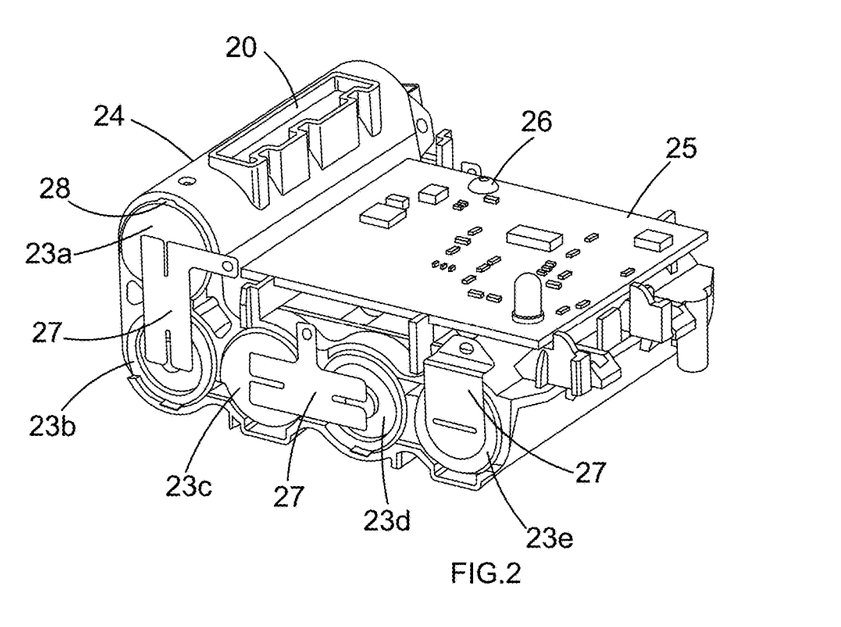
FIG. 2 shows a perspective view of the battery pack according to one embodiment.

FIG. 2 shows a perspective view of the battery pack 20 without the optional outer shell. FIG. 2 shows five battery cells 23a, 23b, 23c, 23d, and 23e mounted in the battery pack housing 24, but in other embodiments there may a different number of battery cells. In some embodiments there may be a single pair of battery cells housed in the battery pack housing 24. Alternatively there may be any number of battery cells. A printed circuit board (PCB) 25 for controlling the charging and discharging of the battery cells 23 is mounted on the battery housing 24. The PCB 25 and its controlling functions are known and are not described in any further detail. The PCB 25 is mounted to the housing 24 with a screw 26.

Each of the battery cells 23a to 23e are connected to the PCB 25 by an electrical connecting plate 27. Typically the battery cells 23a to 23e are electrically connected together in series, but the battery cells 23a to 23e may be electrically connected together in alternative ways.

In some embodiments the battery cells 23a to 23e are lithium based cells. The battery cells 23a to 23e can be Li-ion cells, lithium polymer cells, lithium metal cells or any other lithium based cell. Li-ion cells are vulnerable to physical shock and the housing 24 provides protection to the Li-ion cells. In other embodiments the battery cells 23a to 23e can be any other type of battery cell.

Figure 3:
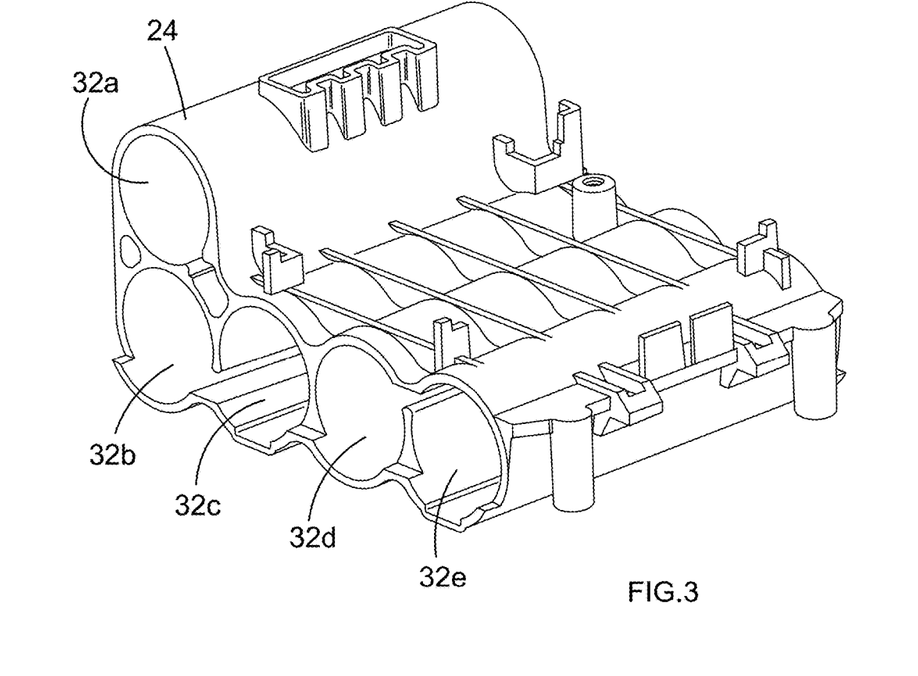
FIG. 3 shows a perspective view of the battery pack housing according to one embodiment.
Figure 4:
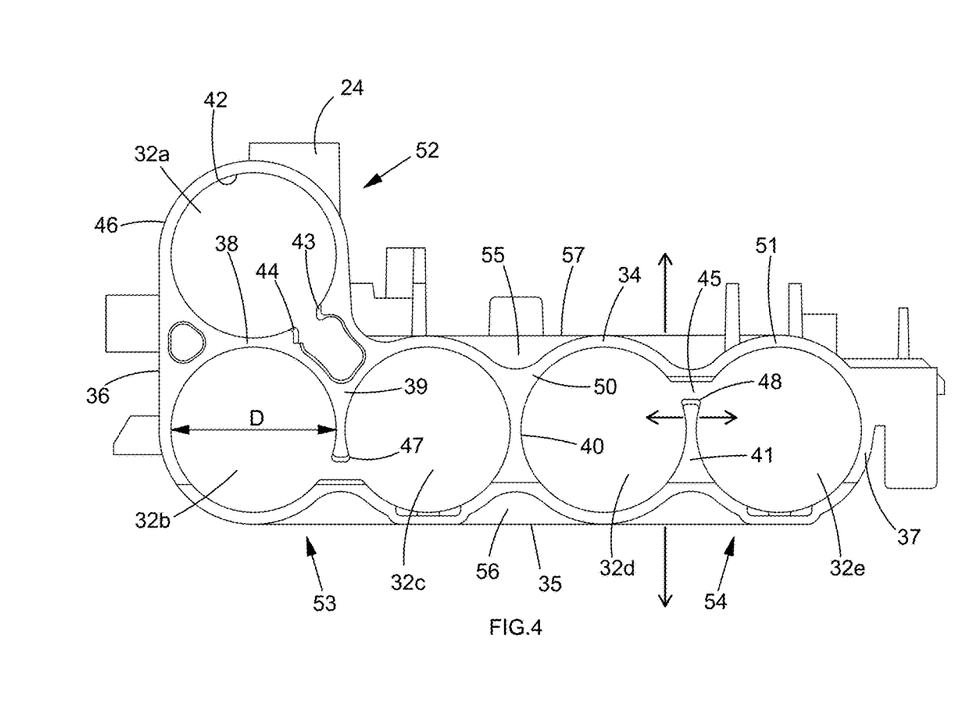
FIG. 4 shows a side view of the battery pack housing according to one embodiment.

Turning to FIGS. 3 and 4, the structure of the battery pack housing 24 will now be discussed in further detail. FIGS. 3 and 4 show a perspective view and a side view of the battery pack housing 24 without the battery cells 23a to 23e. The battery pack housing 24 may be made from a thermoplastic material and moulded as a single, unitary piece. By making the battery pack housing 24 from a single piece, assembly of the battery pack 20 is much easier and quicker.

However in other embodiments the battery pack housing 24 can be made from multiple pieces (not shown), for example a top piece and a bottom piece which clip together. For example, in some circumstances the shape of the battery pack housing may be too complicated for a single moulding process and requires two moulded pieces to form the shape.

Referring to FIG. 4, the battery pack housing 24 comprises a top wall portion 34, a bottom wall portion 35, a first side wall portion 36 and a second side wall portion 37. The exemplary battery pack housing 24 shown in FIGS. 3 and 4 comprises a single integral element. The top wall portion 34, the bottom wall portion 35, the first side wall portion 36 and the second side wall portion 37 are all linked together and are part of the same integral battery pack housing 24. The top and bottom wall portions 34, 35 are on opposing sides of the battery pack housing 24. Similarly the first side wall portion 36 and the second side wall portion 37 are on opposing sides of the battery pack housing 24.

The top, bottom and side 34, 35, 36, 37 wall portions generally define a hollow structure for receiving the battery cells 23. The battery pack housing 24 further comprises dividing walls 38, 39, 40 and 41. The dividing walls 38, 39, 40, 41 are also integral with the battery pack housing 24 and form part of the same integral element as the top, bottom and side walls 34, 35, 36, 37. Dividing walls 39 and 41 protrude from the top wall 34 and the bottom wall 41 respectively and dividing walls 39 and 41 respectively comprises a free end 47, 48.

The walls of the battery pack housing 24 define a plurality of holes 32 for receiving the battery cells. Of course the walls may define only one hole 32, or any number of holes. The holes in FIGS. 3 and 4 have been labelled 32a, 32b, 32c, 32d, 32e so that the holes may be distinguished from each other.

The battery cells 23a to 23e are substantially cylindrical in shape and the holes 32a to 32e in the battery pack housing 24 define a shape substantially corresponding to the shape of the battery cells. That is the holes 32a to 32e are also substantially cylindrical in shape. When each of the battery cells 23 is inserted into one of the holes 32a to 32e the inside surface 42 of the battery pack housing 24 engages with the outer surface 28 (as shown in FIG. 2) of the battery cell 23.

The size of the holes 32a to 32e corresponds to a minimum size of the manufacturing tolerance of the battery cells 23a to 23e. This means every battery cell from a particular manufacturing process will fit snugly in the battery pack housing 24. In reference to FIG. 4, the diameter D of the hole 32b is approximately equal or slightly larger than to the minimum diameter within the manufacturing tolerance of the battery 23. The diameter D of the hole is slightly larger than the battery such that an interference fit is provided between the inside surface 42 and the outer surface of the battery cell 23.

Each hole 32a to 32e has the same diameter D for receiving the battery cells of the same size and shape. This means a frictional force between the battery pack housing 24 and each battery cell 23 holds the battery cells 23 in place. In other embodiments the battery cells are not cylindrical and may have another cross sectional shape for example, triangular, rectangular or square and the holes 32a to 32e will be correspondingly shaped.

As can be seen from FIG. 3, each hole 32a to 32e extends along a longitudinal axis. The longitudinal axis of the hole 32a to 32e is aligned with the longitudinal axis of the battery cell 23 when the battery cell 23 is located in the hole 32a to 32e (as shown in FIG. 2).

Use and assembly of the battery pack housing 24 will now be discussed.

The diameter of the battery cells 23 may vary due to manufacturing tolerances. The battery pack housing 24 is adapted to receive battery cells 23 which vary over a manufacturing tolerance range. For example, the battery cells 23 may vary in diameter by 1.6 mm over a 20 mm diameter. The minimum diameter of the battery cell may be 18.4 mm and the maximum diameter of the battery cell may be 21.6 mm. The battery pack housing 24 comprises flexibly resilient portions which distort. For example the top wall portion 34, the bottom wall portion 35 and the dividing wall 41 are all flexibly resilient parts of the wall of the battery pack housing 24. When a larger sized battery (with a diameter larger than the minimum diameter of the manufacturing tolerance and diameter D of the holes 32a to 32e) is put in a hole, a portion of the battery pack 24 will flex to accommodate variation in the sizes of the battery cells.

The flexibly resilient characteristic of the battery pack housing material means that the battery pack housing 24 will clamp the larger sized battery cell 23 as the material tries to return to its rest position. The rest position is the relative position of the walls of the battery pack housing 24 when no battery cells are located in the holes. The flexibly resilient portions mean that the battery pack housing 24 can fit all the different sized battery cells 23 over the entire manufacturing tolerance.

The maximum distortion of the battery pack housing is such that the maximum diameter of the holes 32a to 32e will exceed the maximum diameter of the manufacturing tolerance of the battery cells 23a to 23e.

Each hole 32a to 32e has a diameter which is slightly larger than the minimum manufacturing tolerance of the battery cell 23. In other words the smallest battery cells 23 within the manufacturing tolerance will have an interference fit in the holes 32a to 32e. If two minimum sized battery cells 23 are inserted into the holes 32b and 32c, then both the two battery cells 23 are held in place with an interference fit. In this case the battery pack housing 24 does not change shape.

The battery pack housing 24 is arranged to flex along different directions depending on the size of the battery cell being inserted into the holes 32a to 32e.

The battery pack housing 24 comprises three groups of holes 52, 53, 54. The group of holes share flexible portions of wall of the battery pack housing 24 and movement of the shared flexible portions of wall affect the fit of the battery cells in the holes of the group. There may be any number of groups of holes in the battery pack housing 24.

The first group 52 comprises hole 32a, the second group 53 comprises holes 32b and 32c and the third group 54 comprises holes 32d and 32e. The second and third 53, 54 groups of holes comprise a pair, of holes each and each group of holes comprise a common dividing wall 39 and 41 respectively.

The first group 54 is an arrangement for receiving a single battery cell 23. The single hole 32a could be used on its own. The single hole 32a comprises a substantially circular cross section. A wall 46 defining the inside surface 42 of the single hole 32a comprises an open loop and defines a "C-shaped" cross section and the inside surface 42 of the wall terminates at faces 43 and 44. When one of the battery cells 23 which has a larger diameter than the hole 32a is inserted into the hole 32a the flexibly resilient wall 46 distorts and faces 43 and 44 move apart. The C-shaped cross section of the wall 46 defining the hole 32a clamps on the inserted battery cell 23 as the wall 46 attempts to return to its rest position. The inside surface 42 of the hole 32a clamps along the entire length of the inserted battery cell 23. This means that the inside surface 42 engages the outer surface of the inserted battery cell 23 and clamps along its entire length and area.

This increases the frictional force between the inside surface 42 of the hole 32a and the outer surface of the battery cell 23a and provides a good fit.

The second group 53 and third group 54 of holes are essentially the same and will be described now in reference to the third group 54 of holes only. The third group of holes 54 comprises a pair of adjacent holes 32d, 32e. A pair of wall portions 50, 51 define the holes 32d and 32e, respectively and also have a C-shaped cross section similar to the first group 52.

The holes 32d and 32e are adjacent and share a common dividing wall 41. The common dividing wall 41 is separated from the top wall portion 34 by longitudinal slot 45. Longitudinal slot 45 runs down the entire length of the hole 32d and 32e and the longitudinal slot 45 provides the C-shaped cross section. The longitudinal slot 45 joins the holes 32d and 32e together. This means that the common dividing wall 41 is free to flex with respect to the battery pack housing 24 (as shown in FIG. 4) leftwards, e.g. towards hole 32d or rightwards, e.g. towards hole 32e. Furthermore the top wall portion 34 above holes 32d and 32e is not joined to the bottom wall portion 35 by the common dividing wall 41. This means that the top wall portion 34 is able to flex with respect to the battery pack housing 24 upwards, e.g. away from holes 32d and 32e and bottom wall portion 35 is able to flex with respect to the battery pack housing 24 downwards e.g. away from holes 32d and 32e. Arrows indicate in FIG. 4 how the wall portions of the battery pack housing 24 can move in the vicinity of holes 32d and 32e.

Instead of providing a slot and separating the walls from each other, in alternative embodiments the walls may be flexibly resilient by providing portions of the wall with a different material such as an elastomeric material.

Figure 5:
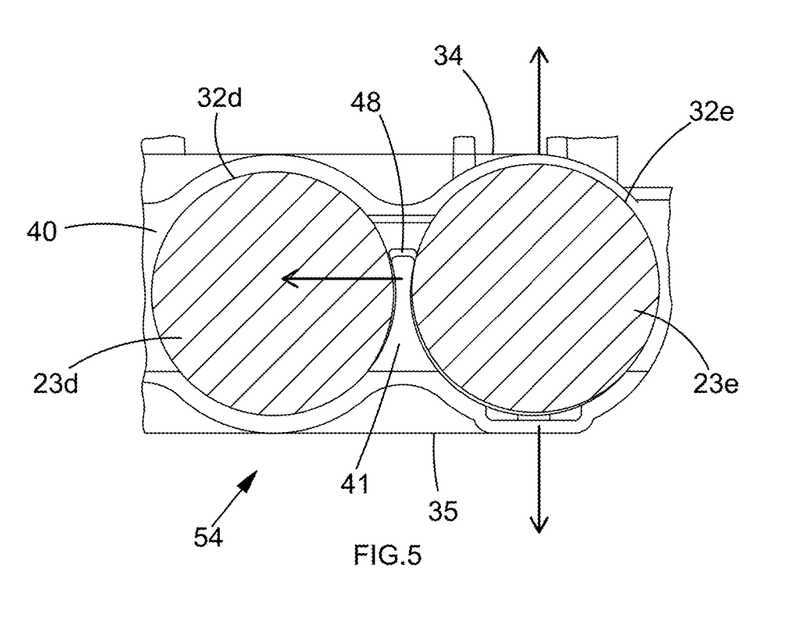
FIG. 5 shows a partial schematic side view of the battery pack housing according to one embodiment.

A larger diameter battery cell 23e is placed into hole 32e as shown in FIG. 5. FIG. 5 shows a schematic side view of a portion of the battery pack housing and the third group 54. The battery cell 23e has a larger diameter than the hole 32e. As such, the top wall portion 34 and the bottom wall portion 35 are distorted and move away from each other to accommodate the larger sized battery cell 23e. The top wall portion 34 and the bottom wall portion 35 then exert a clamping force on the battery cell 23e as the top and bottom wall portions 34 and 35 attempt to return to their rest positions.

At the same time the dividing wall 41 is urged away from the larger sized battery cell 23e and towards hole 32d. The side walls 37 and 36 are not configured to distort substantially. The dividing wall 41 is more flexible because it has a free end 48 and will deflect more easily than the side walls 37, 36 or the other dividing wall 40 coupled to both the top and bottom wall portions 34, 35. When the common dividing wall 41 flexes towards hole 32d and battery cell 23d, the dividing wall 41 will clamp against the battery cell 23d. The amount the dividing wall 41 flexes will depend on the size of the battery cell 23d in the hole 32d.

The greatest amount of deflection of the dividing wall 41 will occur when a maximum sized (within the manufacturing tolerance) battery cell 23e is located adjacent to a minimum sized battery cell 23d. The minimum sized battery 23d would normally be held in place with an interference fit in hole 32d. However the larger sized battery cell 23e located in the adjacent hole 32e will affect the normal interference fit in the adjacent hole 32d.

As mentioned, the top wall portion 34 and the bottom wall portion 35 move apart around the hole 32e containing the larger sized battery cell 23e. The top wall portion 34 and the bottom wall portion 35 will also move, albeit much less so around the adjacent hole 32d. When the battery cell 23d is the minimum size, the dividing wall 41 will clamp against the battery cell 23*d*. The clamping action of the dividing wall 41 will grip the battery cell 23*d* against the internal surface of the hole 32*d* and this will ensure a good fit even if the top wall portion 34 and the bottom wall portion 35 more away from each around hole 32*d*.

If two equal and larger sized battery cells are located adjacent to each other then only the top wall portion and the bottom wall portion will move apart. The dividing wall portion will remain centrally between the two holes 32*d*, 32*e*.

The groups of holes 54, 53 are separated by a reinforced portion 55 which is thicker than the tapered portion of top wall 57 immediately above the holes 32*d*. The bottom wall 56 also comprises a similar reinforced portion 56. This means that deflection of the top wall portion 34 and the bottom wall portion 35 is localized around each group of holes. The larger battery cells located in the third group 54 of holes will not move the top wall portion 34 away from the bottom wall portion in the region of the second group 53 of holes.

Figure 6:
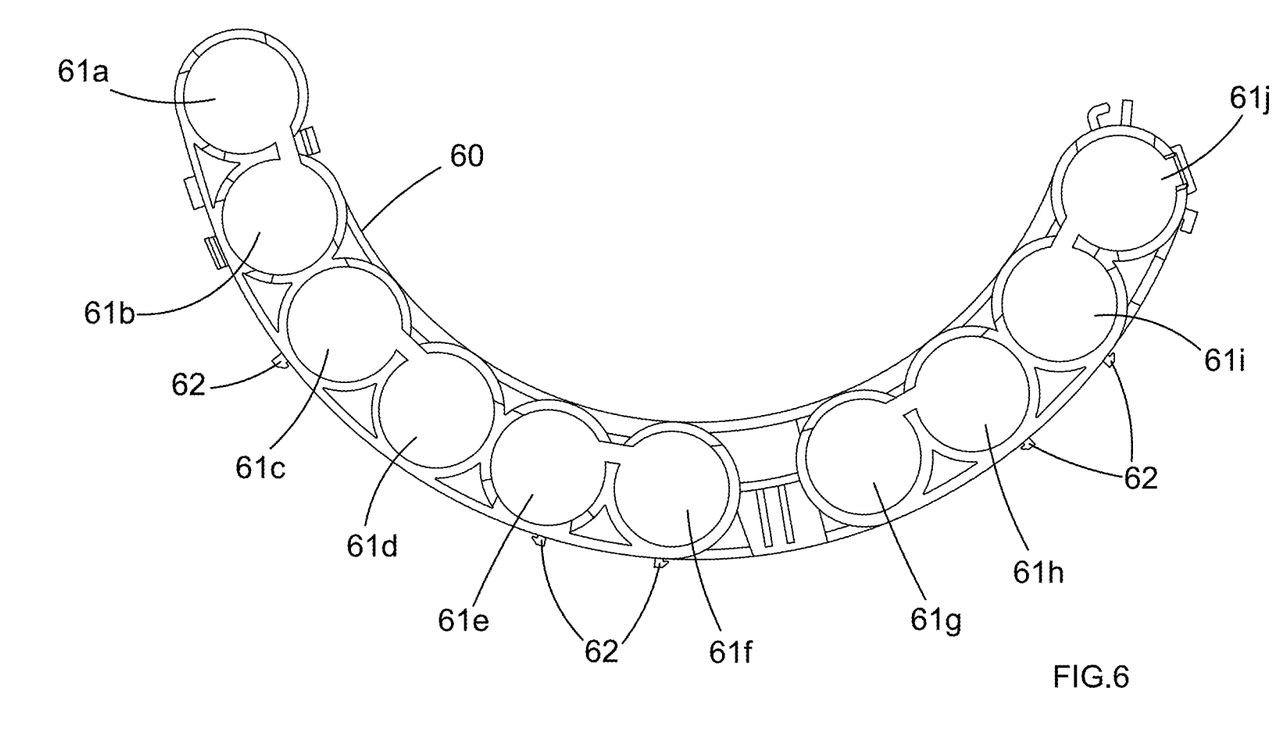
FIG. 6 shows a side view of the battery pack housing according to another embodiment.

Another embodiment will now be discussed in reference to FIG. 6. FIG. 6 shows a battery pack housing 60 which functions in the same way as the battery pack housing as discussed above in respect of the previous embodiments. The battery pack housing 60 comprises an arcuate shape and the holes 61*a* to 61*j* receive battery cells arranged along an arcuate path. The battery pack housing 60 is curved so that it can fit around a curved structure in the electrical product like a motor or a cylindrical dust bowl of a vacuum cleaner. The battery pack housing 60 comprises pairs of holes which function in the same way to the groups of holes as mentioned in respect of FIGS. 3 to 5. The battery pack housing 60 comprises clips 62 for clipping the battery pack housing into the electrical product (not shown).

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A battery pack comprising:
    a first battery cell and a second battery cell, the first and second battery cells each have a size within a manufacturing tolerance; and
    a housing comprising at least one wall defining a first hole and a second hole, each hole for receiving one of the first or second battery cells, each hole having a size corresponding to a minimum size within the manufacturing tolerance; and
    a flexibly resilient internal dividing wall between the first and second holes moveable between a rest position and a clamping position whereby the flexibly resilient internal dividing wall clamps against at least one of the first and second battery cells when one of the first or second battery cells has a size greater than the minimum size within the manufacturing tolerance.

2. A battery pack according to claim 1 wherein the internal dividing wall comprises a slot connecting the first hole to the second hole.

3. A battery pack according to claim 1 wherein the flexibly resilient internal dividing wall comprises a top wall portion of the housing and a bottom wall portion both moveable relative to each other.

4. A battery pack according to claim 1 wherein the housing is a unitary moulded element.

5. A battery pack according to claim 1 wherein the cross section shape of the first and second holes and the first and second battery cells is circular.

6. A battery pack according to claim 1 wherein an inside surface of the first and second hole is engageable with the outer surface of the received first and second battery cell along substantially the entire longitudinal axis of the first and second battery cell.

7. A battery pack according to claim 1 wherein the first and second battery cells are lithium based battery cells.

8. A battery pack according to claim 1 wherein the housing is mounted within a protective outer shell.

9. A battery pack according to claim 1 wherein each hole has a size corresponding to a minimum size within the manufacturing tolerance such that the first and second battery cells are held in the first and second holes with an interference fit.

10. A battery pack according to claim 1 wherein the housing further comprises a plurality of groups of first and second holes and first and second battery cells, each group comprising a separate flexible resilient portion.

11. A method of manufacturing a battery pack comprising:
    moulding a housing comprising at least one wall defining a first hole and a second hole, each hole for receiving one of a first or a second battery cell, each hole having a size corresponding to a minimum size within a manufacturing tolerance of a size of the first and second battery cells; and a flexibly resilient internal dividing wall between the first and second holes moveable between a rest position and a clamping position whereby the flexibly resilient internal dividing wall clamps against at least one of the first and second battery cells when one of the first or second battery cells has a size greater than the minimum size within the manufacturing tolerance; and
    inserting the first and second battery cells into the first and second holes respectively.

* * * * *